United States Patent [19]

Sikkema

[11] Patent Number: 4,758,651
[45] Date of Patent: Jul. 19, 1988

[54] AMORPHOUS AROMATIC COPOLYAMIDE, A PROCESS FOR THE PREPARATION THEREOF, AND SHAPED OBJECT

[75] Inventor: Doetze J. Sikkema, Ellecom, Netherlands

[73] Assignee: Akzo NV, Arnhem, Netherlands

[21] Appl. No.: 19,675

[22] Filed: Feb. 27, 1987

[30] Foreign Application Priority Data

Mar. 19, 1986 [NL] Netherlands .................... 8600695

[51] Int. Cl.$^4$ ..................... C08G 69/12; C08G 69/32
[52] U.S. Cl. ................... 528/329.1; 524/606; 524/607; 528/184; 528/185; 528/208; 528/321; 528/330; 528/331
[58] Field of Search .................. 528/329.1, 331, 208, 528/184, 321, 330, 185

[56] References Cited

U.S. PATENT DOCUMENTS

| | | | |
|---|---|---|---|
| 3,240,760 | 3/1966 | Preston et al. | 528/329.1 |
| 3,554,971 | 1/1971 | Jones et al. | 260/47 |
| 3,560,440 | 2/1971 | Gilch et al. | 260/47 |
| 4,072,665 | 2/1978 | Onder | 260/78 |
| 4,172,938 | 10/1979 | Mera et al. | 260/78 |
| 4,410,684 | 10/1983 | Nelb, II et al. | 528/185 |
| 4,507,467 | 3/1985 | Shimada et al. | 528/329.1 |

FOREIGN PATENT DOCUMENTS 1260362  1/1972  United Kingdom.

OTHER PUBLICATIONS

Chem. Abstracts No. 165270q, vol. 83, 1975, p. 53.

Primary Examiner—Harold D. Anderson
Attorney, Agent, or Firm—Parkhurst & Oliff

[57] ABSTRACT

An amorphous, injection-moldable copolyamide comprising linear chains of each of the units having the formulae:

(I) —CO—Ar—CO—,
(II) —NH—Ar—CO—, and
(III) —NH—Ar—CO—, wherein Ar represents one or more optionally substituted arylene radicals selected from the group consisting of (1) para oriented arylene,
(2) meta oriented arylene,
(3) arylene-X-arylene, wherein X is —C(Y)(H)—, —O—, —S—, —SO$_2$— or —CO—, with Y is H or C$_{1-43}$-alkyl, and
(4) arylene-CZZ'-arylene, wherein Z,Z' are alkyl or cycloalkyl, provided that at least one of the units of the formulae (I), (II) or (III) are arylene radicals from more than one of the groups (1), (2), (3) and (4). Said units are preferably present in a molar ratio of 17–41.5% of (I), 17–41.5% of (II) and 17–66% of (III).

16 Claims, No Drawings

AMORPHOUS AROMATIC COPOLYAMIDE, A PROCESS FOR THE PREPARATION THEREOF, AND SHAPED OBJECT

The invention relates to an amorphous copolyamide of which the amide groups are linked to aromatic rings. The invention also relates to a process for the preparation of such copolyamides. The invention moreover relates to shaped objects obtained by melt molding such copolyamides.

Aliphatic polyamides are generally know to be employed in a great variety of applications in which they can be subjected to melt processing techniques. Aromatic polyamides are also well-known and offer the advantage of an excellent high temperature resistance. Their high melting point, however, does not permit the use of melt processing techniques. Yarn of aromatic polyamide is therefore spun from a solution.

Attempts have already been made to overcome the problems concerning the high melt temperature by the incorporation into aromatic polyamides of aliphatic units. Cf., e.g., U.S. Pat. No. 4,072,665.

Injection moldable wholly aromatic copolyamides, in the sense that all the amide groups are directly linked to aromatic rings, are described in U.S. Pat. No. 4,410,684. These copolyamides comprise a polymer of metaphenylene dicarboxylic acid and metaphenylenediamine, part of the metaphenylene radicals of the diamine units being replaced with a special phenylene ether which comprises four aromatic nuclei.

Furthermore, aromatic copolyamides comprising amidophenoxy benzoyl units are known from GB-A-No. 1,260,362, which known copolyamides are built from three different monomers. These tercopolyamides show a somewhat improved processability in being soluble in polar solvents without the necessity of adding salts such as lithium chloride. One relatively low melting product is disclosed.

The present invention has for its object to provide an aromatic copolyamide which is prepared from readily available monomers and can be molded by melt processing techniques without losing its excellent thermal stability.

It has been found that the object envisaged is attained by using a copolyamide comprising linear chains of each of the amide linked units of the formulae:
(I) —CO—Ar—CO—
(II) —NH—Ar—NH—
(III) —NH—Ar—CO—
wherein Ar independently represents one or more arylene radicals selected from the groups of arylene radicals of the formulae:

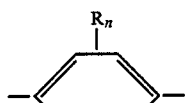  (i)

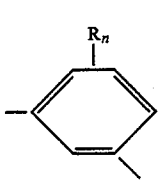  (ii)

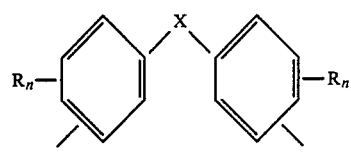  (iii)

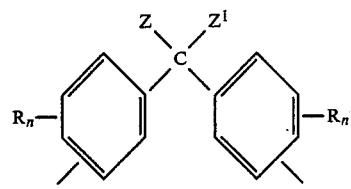  (iv)

wherein
R is H, $C_{1-4}$-alkyl; $C_{1-4}$-alkoxy, Cl, F, aryl-$C_{1-4}$-alkyl
X is

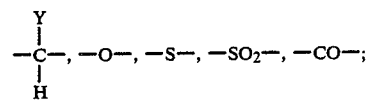

Y is H or $C_{1-4}$ alkyl;
Z,Z' may be the same or different and represent $C_{1-4}$ alkyl or together represent cyclohexyl,
n=1–4,
and in the formulae (iii) and (iv) the free valencies are in the position meta or para relative to the aryl-X or aryl-CZZ' bond, with the proviso that at least one of the units of formula (I), (II) or (III) comprises different arylene radicals from more than one of the groups of formulae (i), (ii), (iii) and (iv), respectively.

Whereas the well-known (co)polyamides built up from meta- and/or para-oriented arylene radicals display a high degree of crystallinity and are not thermally moldable at practical temperatures, the novel copolyamides according to the invention surprisingly showed an amorphous character and at temperatures considerably below the decomposition temperature they were found to be thermally moldable, for instance by injection molding. Shaped objects of the new copolyamides retain their shape at elevated temperature and favorably compare with those of different types of polymers known as high temperature plastics, such as polyamide-imide and polyether-ether ketone.

The present copolyamides are built up from the conventional units —CO—AR—CO—, —NH—Ar—NH— and —NH—Ar—CO—. They are, however, not of the usual nylon-6,6 type obtained from dicarboxylic acids and diamines, or of the nylon-6 type obtained from aminocarboxylic acids, but contain units from all three groups of the formulae (I), (II) and (III). But this condition is not sufficient. It was established that for the object envisaged the present copolyamide must be built up from at least four different units. From at least one of the groups (I), (II) or (III) at least two units with arylene radicals from different groups having the formulae (i), (ii), (iii) and (iv), respectively, must be present.

For the balance between CO and NH groups it is necessary, of course, that the units of formula (I) and formula (II) are present in practically equal numbers. In the preparation of the copolyamide, however, use may be made of a small stoichiometric excess of dicarboxylic acid relative to diamine, or of diamine relative to dicarboxylic acid, in order to fix the nature of the terminal groups or to control a preselected degree of polymerization. Also known chain length regulating agents may be used.

The present copolyamides generally comprise 17–41.5 mole % of the units (I), 17–41.5 mole % of the units (II) and 17–66 mole % of the units (III). Molar ratios between the units that fall outside said ranges generally lead to polyamides that are no longer thermally processable. It is preferred that the present copolyamide should comprise 20–40 mole % units (I), 20–40 mole % units (II) and 20–60 mole % units (III). In actual practice use may be effectively made of equimolar amounts of the constituent units, e.g. four different units of 25% [1×(I)+1×(II)+2×(III)] each or five different units of 20% [2×(I)+2×(II)+1×(III)] each, etc.

Although the present invention is primarily directed to wholly aromatic copolyamides, a small proportion of the arylene radicals may have been replaced with aliphatic diradicals, which however detracts from the thermal stability.

The aromatic diradicals interlinked in the present copolyamides by amide bonds have the above formulae (i), (ii), (iii) and/or (iv).

The arylene radical of formula (i) is a 1,4- or para-oriented phenylene radical which may optionally contain 1 to 4 inert substituents, such as methyl, methoxy or chloro. In the copolyamide the valencies, which are at an angle of 180° to each other, are linked to the nitrogen or carbon atom of the amide group. As examples of suitable monomers from which the arylene radicals of formula (i) are derived may be mentioned: terephthalic acid, 2,5-toluene dicarboxylic acid, paraphenylene diamine, 1,4-diamino-2-methoxy benzene, 4-aminobenzoic acid, 4-amino-3-methyl benzoic acid, 4-amino-2-chlorobenzoic acid, etc. Under suitable polymerization conditions active derivatives thereof, such as the acid chlorides, esters, alkyl amides, N-alkyl amines and acid addition salts result in the same arylene units in the polyamide chain.

The arylene radical of formula (ii) is a 1,3- or meta-oriented phenylene radical which may optionally be substituted. The valencies are at an angle of 120° to each other, so that incorporation of a unit having this formula causes a "kink" in the polyamide chain. Examples of suitable monomers or their active derivatives which lead to arylene radicals of formula (ii) include: isophthalic acid, 2,4-toluene dicarboxylic acid, 2,6-diamino toluene, metaphenylene diamine, 3-aminobenzoic acid, etc.

The arylene radical of formula (iii) comprises two aryl nuclei, which are both linked to a group X, such as methylene, 1,1-ethylene, oxo, thio, sulphone or carboxyl. The valency angle between the two aryl-X-bonds is dependent on the nature of X and may be in the range of 109° to 120°. Also incorporation of a unit of formula (iii) leads to a "kink" in the polyamide chain. As examples of suitable monomers may be mentioned: bis(4-carboxyphenyl) ether, 4-aminophenyl-4-carboxyphenyl methane, bis(4-aminophenyl) ether, bis(4-aminophenyl) methane, bis(4-aminophenyl) ethane1,1, bis(4-carboxyphenyl)sulphone, bis(4-aminophenyl) sulphone, 4-aminophenyl-4-carboxyphenyl sulphide, etc., and their active derivatives.

The arylene radical of formula (iv) comprises two aryl nuclei which are both linked to a secondary (cyclo)alkylene radical. Because of the tetrahedral coordination of the carbon atom the incorporation of a unit of formula (iii) also will lead to a "kink" in the polyamide chain. The units of formula (iv) differ from those of formula (iii) because of the presence of two sterically hindering substituents at the bridging C atom. Examples of suitable monomers include bis(4-aminophenyl)propane-2,2, bis(4-aminophenyl)cyclohexane-1,1, bis(4-amino-3-methylphenyl)cyclohexane-1,1 and their active derivatives.

It is preferred that the copolyamide according to the invention should comprise units of formula II, wherein Ar stands for an arylene radical of formula (iii) or (iv). Copolyamides which comprise units of the formulae (II, iii) or of formula (II, iv) as well as of the formulae (I) and (III), respectively, satisfy the above defined conditions and are thermoplastic.

If the copolyamide exclusively comprises units either of formula (II, iii) or of formula (II, iv), the unit of formula (I) or (III) must comprise more than one type of arylene radical. Then it is preferred that the copolyamide should comprise several units of formula (III), wherein Ar stands for arylene radicals of formulae (i) and (ii), respectively.

A preferred copolyamide according to the invention comprises four components, viz. a unit of formula (I,i), e.g. terephthaloyl, or of formula (I, ii), e.g. isophthaloyl, a unit of formula (II, iii), e.g. methylene-4,4'-dianilido, and two units of fomula (III, i.), e.g. 4-amidobenzoyl, and of formula (III, ii), e.g. 3-amidobenzoyl, respectively.

The new copolyamides may be prepared by methods known to be used for the preparation of polyamides. One method is the solution polymerization in a polar solvent or solvent-salt system. It is preferred then to use the acid halide derivatives of the carboxy monomers as starting substance. Optionally, use may be made of an acid binder.

Another method is the melt condensation of the mixture of the starting monomers or their active derivatives. The method may be carried out, if desired, in the presence of a catalyst and at subatmospheric pressure.

Particularly suitable for the preparation of the present copolyamides appears to be the melt condensation, in which acylated, more particularly acetylated amine compounds are used as starting monomers. To this end a small excess of, say, acetic anhydride, based on the amino functionality, is added to the starting mixture of amino and carboxylic acid compounds, as a result of which the amino groups are converted into acetamido groups. In the subsequent condensation step at elevated temperature, e.g. 240°–300° C., polycondensation of the carboxy and acetamido groups is brought about with acetic acid being split off, which together with the acetic acid evolved in the acetic anhydride treatment will evaporate from the reaction mixture, aided if necessary by a reduction in pressure.

Carrying out the polycondensation reaction in one step is not recommended, because at the desired degree of polymerization the endproduct is difficult to remove from the reaction vessel equipped with a stirrer and other means. It is therefore preferred that the polycondensation should be carried out until about 90–95% of the theoretical amount of acetic acid is distilled off and a viscous reaction mixture is obtained from which the prepolymer is isolated, for instance by pouring into water, filtering off and drying. The resulting prepolymers generally show a relative viscosity in the range of 1:1 to 1:2 when measured as 1% by weight solution in 100%-sulphuric acid.

In a second step the prepolymer is subjected to postcondensation at a somewhat higher temperature of 275°–325° C. Then the degree of polymerization is increased up to relative viscosities (1% by weight solution in 100%-sulphuric acid) of the polyamide of the order of 2.5 or higher, at which it shows the favorable mechanical properties in combination with a glass transition temperature which permits melt molding at technically feasible temperatures. It is preferred that the postcondensation should be carried out at reduced pressure, for instance at a pressure below 100 Pa.

In the polycondensation reaction, particularly in the first step, use may be made of a catalyst commonly employed in condensation reactions, such as sodium acetate. Use of a catalyst is not necessary, especially when during at least part of the pre-polycondensation the pressure is reduced. Since during pre-polycondensation relatively large amounts of acetic acid will still evaporate, a relatively low subatmospheric pressure may be used.

Depending on the degree of polymerization and the nature of the constituent units the copolyamides according to the invention will show a $T_g$ above 200° C., more particularly a $T_g \geq 250°$ C.

At a temperature in the range of 340° to 390° C. and under an appropriate shear stress the copolyamides display an apparent melt viscosity which is indicative of their being suitable to be processed by injection molded techniques.

The copolyamide of the invention may be molded by conventional techniques, such as compression molding, extrusion molding or injection molding at suitable temperatures depending on the viscosity requirements of the technique applied.

Prior to molding, the copolyamide may be compounded with conventional additives which are resistant to the rather high molding temperature. The invention includes the reinforcement of the present copolyamide with fibrous or particulate filler. The use of for example glass fiber, carbon fiber or aramid fiber will improve the notched impact resistance of the shaped articles.

The invention will be further described in the following examples.

EXAMPLE I

A stainless steel 30-l reactor heated by a liquid-filled double wall and equipped with an agitator, a distillation attachment, a distillation condenser and a vacuum line to a distillate receptacle was charged with: 1980 g of bis(4-aminophenyl) methane, 1370 g of 3-aminobenzoic acid, 1370 g of 4-aminobenzoic acid and 1660 g of isophthalic acid (10 moles of each), after which 4.7 l of acetic anhydride (50 moles) were added. Upon addition of the anhydride the temperature of the reaction mixture rose to 110°–120° C. The mixture was heated in about 100 minutes to 250° C. (heating liquid to 290°), in the process of which acetic acid distilled off rapidly under atmosphere pressure; shortly after the beginning of the heating process the stirrer was started. When the reaction mixture was at a temperature of 250° C., the vacuum line was opened and the pressure was slowly reduced for 15 minutes to a value of 0.4 bar (abs.): during evacuation the stirrer resistance increased to values indicative of a viscous (pre)polymer having been formed at the prevailing temperature. The distillation was stopped and the reaction product was extruded into cold water under nitrogen pressure. The granular prepolymer was isolated by filtration and dried at 80°–100° C., 10–20 mbar.

Subsequently, the prepolymer granulate in layers of about 1 cm thick was heated in about 10 cm high Teflon troughs for 1 hour at 300°–305° C. and 0.1–0.2 mbar. It appeared to be effective to use a strongly reduced pressure (1–5 mbar) already during heating.

After the product had been cooled, it was in the form of blocks of foam that were broken up and ground to a particle size sufficiently small for the material to be fed into an extruder.

EXAMPLE II

In accordance with the procedure described in Example I 2000 g of bis(4-aminophenyl)ether, 1370 g of 3-aminobenzoic acid, 1370 g of 4-aminobenzoic acid and 1660 g of isophthalic acid (10 moles of each) were copolymerized into a product having practically the same thermal properties, processability and mechanical properties.

EXAMPLE III

In accordance with the procedure described in Example I 137 g (1 mole) of 4-aminobenzoic acid, 198 g (1 mole) of bis(4-aminophenyl)methane, 291 g (1,75 moles) of isophthalic acid and 200 g (0,75 moles) of bis(4-aminophenyl) cyclohexane-1,1, followed by adding 510 ml (5.4 moles) of acetic anhydride were copolymerized in two steps into a product having thermal and mechanical properties comparable with those of the copolyamide obtained in Example I.

EXAMPLE IV

In a further experiment the molar ratios in a four-monomer composition leading to a thermoplastic copolyamide were determined. To that end the procedure of Example I was repeated on a small scale with variation according to Table I of the content of monomers having formulae I and II.

TABLE I

Thermoplasticity and Tg of aromatic copolyamides with decreasing content of diamine + dicarboxylic acid

| experiment | 3-amino benzoic acid mole | 4-amino benzoic acid mole | bis(4-aminophenyl) methane mole | isophthalic acid mole | Tg °C. | nature[1] |
|---|---|---|---|---|---|---|
| A | 1.0 | 1,0 | 1.0 | 1.0 | 242–252 | thermoplastic |
| B | 1.0 | 1,0 | 0.95 | 0.95 | 228–250 | thermoplastic |
| C | 1.0 | 1,0 | 0.90 | 0.90 | 247–256 | thermoplastic |
| D | 1.0 | 1,0 | 0.80 | 0.80 | 239–264 | thermo- |

TABLE I-continued

Thermoplasticity and Tg of aromatic copolyamides with decreasing content of diamine + dicarboxylic acid

| experiment | 3-amino benzoic acid mole | 4-amino benzoic acid mole | bis(4-amino-phenyl) methane mole | isophthalic acid mole | Tg °C. | nature[1] |
|---|---|---|---|---|---|---|
| E | 1.0 | 1,0 | 0.70 | 0.70 | 242–266 | plastic thermo-plastic |
| F | 1.0 | 1,0 | 0.60 | 0.60 | 241–261 | thermo-plastic |
| G | 1.0 | 1,0 | 0.50 | 0.50 | 186–259 | solid |

[1] determined by the appearance at 300° C. upon completion of the postcondensation reaction

EXAMPLE V

The broken and ground copolyamide obtained according to Example I was fed to an Arburg Allrounder injection molding machine with screw temperatures of 320°–340°–360°–365° C. and formed in a mold of 140° C. to obtain IZOD-1 test bars with a cross-section of 10×4 mm in the test portion. In the Table II below the properties of these test bars are compared with those of test bars prepared under similar conditions of the commercial products Ultem 1000 ® and Peek ®.

TABLE II

Properties of some high temperture plastics determined on injection molded IZOD-1 test bars

| | copolyamide acc. to Ex. I | Ultem 1000 | PEEK[1] |
|---|---|---|---|
| T inj. molding, °C. | 365 | 400 | 400 |
| T mold | 140 | 90 | 140 |
| Heat distortion temperature (HDT), method A | 213 | 186 | 161 |
| Tg start | 235 | 203 | 150 |
| peak tan δ | 265 | 230 | 165 |
| E-modulus, GPa | 4 | 3 | 3.5 |
| strength, MPA, bending | 110 | 94 | 101 |
| elongation, % | 3.2 | 11 | 5.5/46[2] |
| impact strength, Charpy, unnotched, KJ/m | 6 | 39 | no break |
| relative creep rate, 200° C. | 1 | 8 | — |

[1] after 60 min. annealing at 100° C.
[2] elongation at start of plastic flow and elongation at break, resp.

EXAMPLE VI

In this example it is shown that the melt viscosity of the instant copolyamide can be effectively controlled by the use of a chain regulating excess at any of the diamine or dicarboxylic monomers.

Example I was repeated on a reduced scale with the exception that an excess of 0 mmol, 20 mmoles and 33 mmoles, resp., of bis(4-aminophenyl)methane monomer per 1 kg of copolyamide product were used relative to the other monomers. The melt viscosities of the resulting product were measured on a Goettfert rheometer at shear rates of 300 s$^{-1}$ and 1000 s$^{-1}$ and at a temperature of 370° C. These data are found in Table III.

TABLE III

Melt viscosity of 3-aminobenzoic acid/4-aminobenzoic acid/isophthalic acid/bis(4-aminophenyl)methane(1:1:1:1)-copolyamide using various amounts of excess diamine

| | excess diamine (mmol/kg) | at 300 s$^{-1}$ (Pa.s) | η at 1000 s$^{-1}$ (Pa.s) |
|---|---|---|---|
| a | 0 | 1200 | 300 |
| b | 20 | 245 | 170 |

TABLE III-continued

Melt viscosity of 3-aminobenzoic acid/4-aminobenzoic acid/isophthalic acid/bis(4-aminophenyl)methane(1:1:1:1)-copolyamide using various amounts of excess diamine

| | excess diamine (mmol/kg) | at 300 s$^{-1}$ (Pa.s) | η at 1000 s$^{-1}$ (Pa.s) |
|---|---|---|---|
| c | 33 | 100 | 81 |

What is claimed is:

1. A copolyamide which is amorphous and essentially comprises linear chains of each of the amide linked units of the formulae:
   (I) —CO—Ar—CO—
   (II) —NH—Ar—NH—
   (III) —NH—Ar—CO— wherein Ar independently represents one or more arylene radicals selected from the groups of arylene radicals of the formulae:

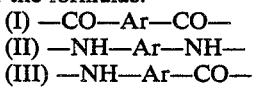
(i)

(ii)

(iii)

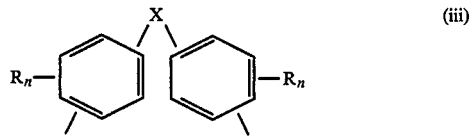
(iv)

wherein
R is H, C$_{1-4}$-alkyl, C$_{1-4}$-alkoxy, Cl, F, aryl or aryl-C$_{1-4}$-alkyl;
X is

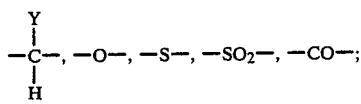

Y is H or $C_{1-4}$ alkyl;

Z,Z' are the same or different and represent $C_{1-4}$ alkyl or together represent cyclohexyl;

n is 1–4, and in the formulae (iii) and (iv) the free valencies are in the position meta or para relative to the aryl-X or aryl-CZZ' bond;

with the proviso that at least one of the units of formula (I), (II) or (III) comprises different arylene radicals from more than one of the groups of formulae (i), (ii), (iii) and (iv), respectively.

2. A copolyamide according to claim 1, characterized by a practically equal number of units of formula (I) and (II), respectively, in the range of 17–41.5 mole % and by 17–66 mole % units of formula III.

3. A copolyamide according to claim 2, characterizd by a practically equal number of units of formula (I) and (II), respectively, in the range of 20–40 mole % and by 20–60 mole % units of formula (III).

4. A copolyamide according to claim 1, characterized in that of the total of arylene radicals less than 50 mole % are of formula (i).

5. A copolyamide according to claim 1, characterized in that the chains of the copolyamide comprise the units of formulae (I), (II) and (III) in random order.

6. A copolyamide according to claim 1, characterized in that the copolyamide has a melt flow index (MFI) of 5–50 g/10 min. at a temperature of 360° C. and a load of 2.16 kg.

7. A copolyamide according to claim 1, characterized by a glass transition temperature in the range of 200° to 300° C.

8. A copolyamide according to claim 1, comprising units of formula (II) wherein Ar stands for an arylene radical of formula (iii) or (iv).

9. A copolyamide according to claim 8, comprising different units of formula III wherein Ar stands for arylene radicals of formulae (i) and (ii), respectively.

10. A copolyamide according to claim 9, comprising a unit of formula (I) wherein Ar has formula (i) or (ii), a unit of formula (II) wherein Ar has formula (iii), and two units of formula (III) wherein Ar has formula (i) and formula (ii), respectively.

11. A copolyamide according to claim 10, comprising units derived from isophthalic acid, m-aminobenzoic acid and p-aminobenzoic acid and a unit of formula (II) wherein Ar has formula (iii).

12. A copolyamide according to claim 11, characterized in that the unit of formula (II) is derived from bis(4-aminophenyl) methane.

13. A copolyamide according to claim 12, comprising substantially the same numbers of each of said four units.

14. A composition comprising a copolyamide according to claim 1 and a fibrous or particulate filler.

15. Shaped object obtained by melt molding a copolyamide according to claim 1.

16. Shaped object according to claim 15 obtained by injection molding.

* * * * *

UNITED STATES PATENT AND TRADEMARK OFFICE
CERTIFICATE OF CORRECTION

PATENT NO. : 4,758,651
DATED : July 19, 1988
INVENTOR(S) : Doetze J. SIKKEMA

It is certified that error appears in the above-identified patent and that said Letters Patent is hereby corrected as shown below:

On the cover page, in the ABSTRACT, line 14, change "$C_{1-43-}$" to -- $C_{1-4}$ --.

Column 2, line 18, change "$C_{14-}$" to -- $C_{1-4-}$ --;

line 51, change "-CO-AR-CO-," to -- -CO-Ar-CO-, --.

Column 7, in TABLE III, in the subheading, change "at 300 $s^{-1}$" to -- η at 300 $s^{-1}$ --.

Column 8, in TABLE III, in the subheading, change "at 300 $s^{-1}$" to -- η at 300 $s^{-1}$ --.

Signed and Sealed this

Seventeenth Day of January, 1989

Attest:

DONALD J. QUIGG

*Attesting Officer*   *Commissioner of Patents and Trademarks*